F. H. RICHARDS.
VARIABLE SPEED MECHANISM FOR CHAINLESS BICYCLES.
APPLICATION FILED APR. 20, 1898. RENEWED OCT. 11, 1905.
898,783.
Patented Sept. 15, 1908.
5 SHEETS—SHEET 3.
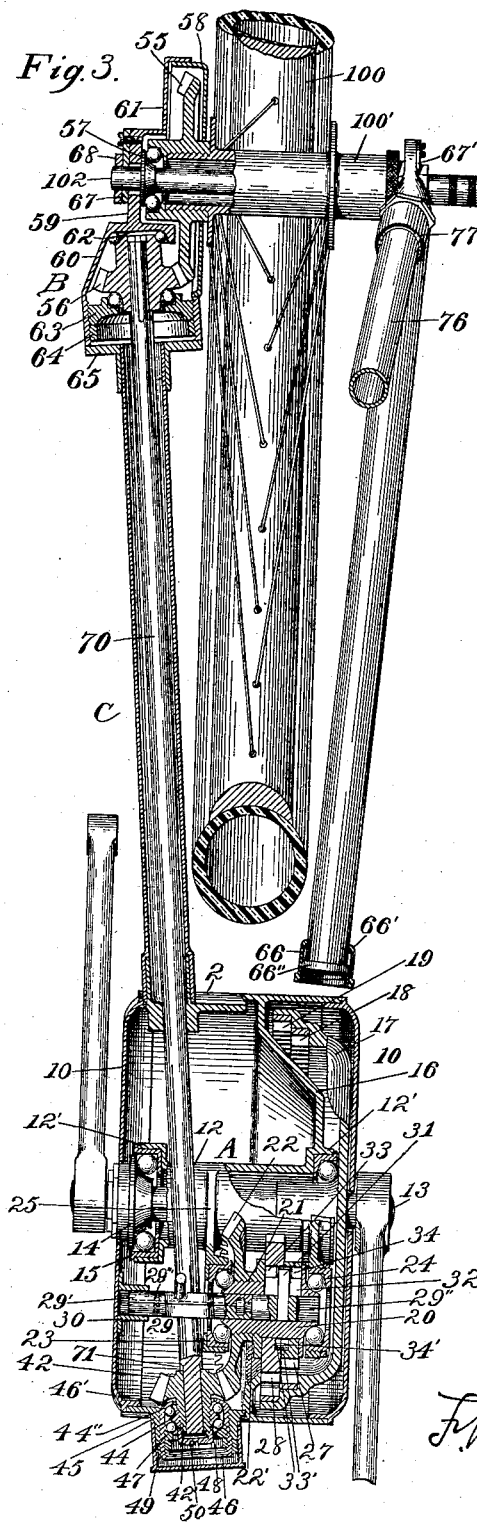
Witnesses.
Inventor.

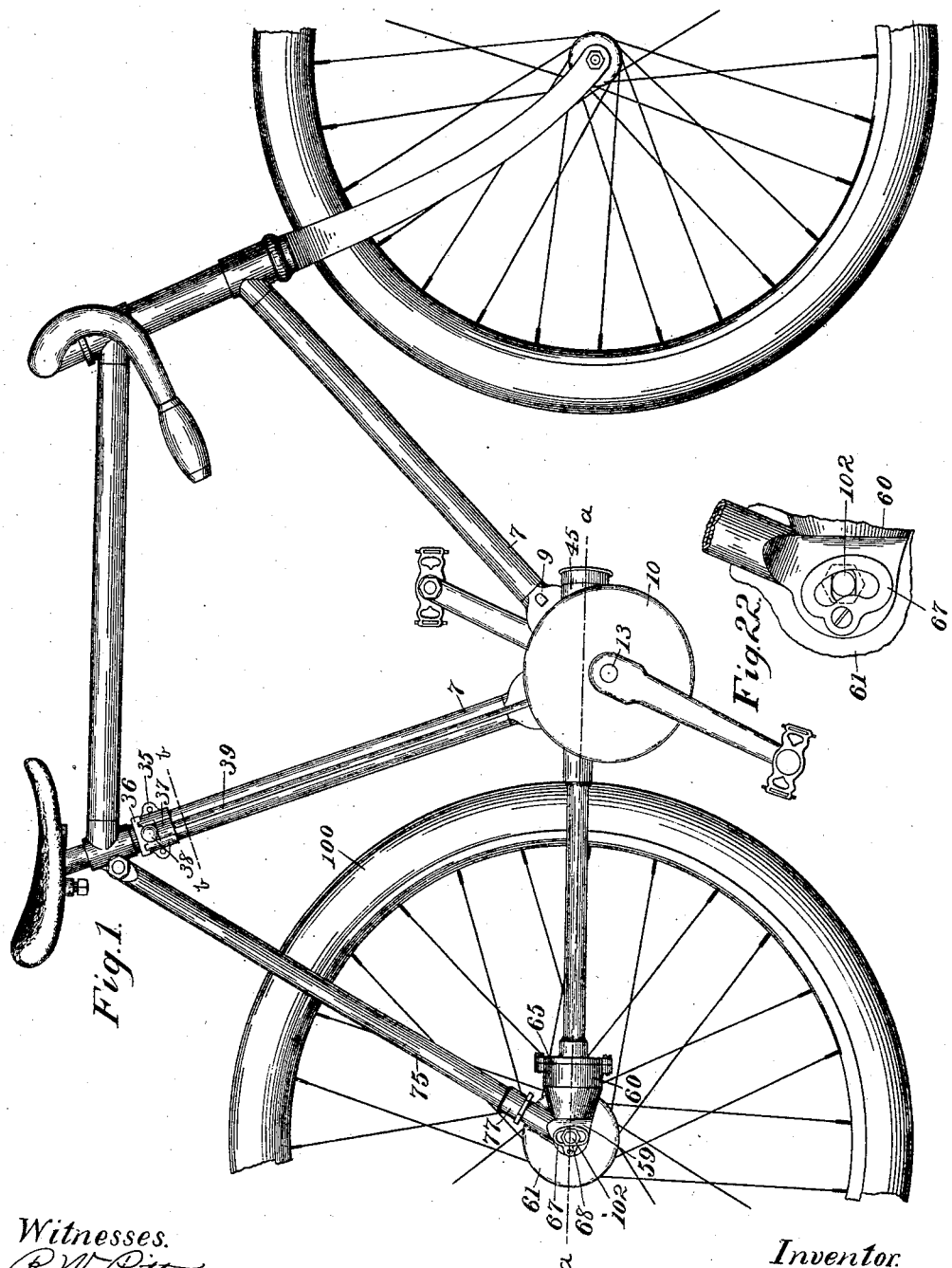

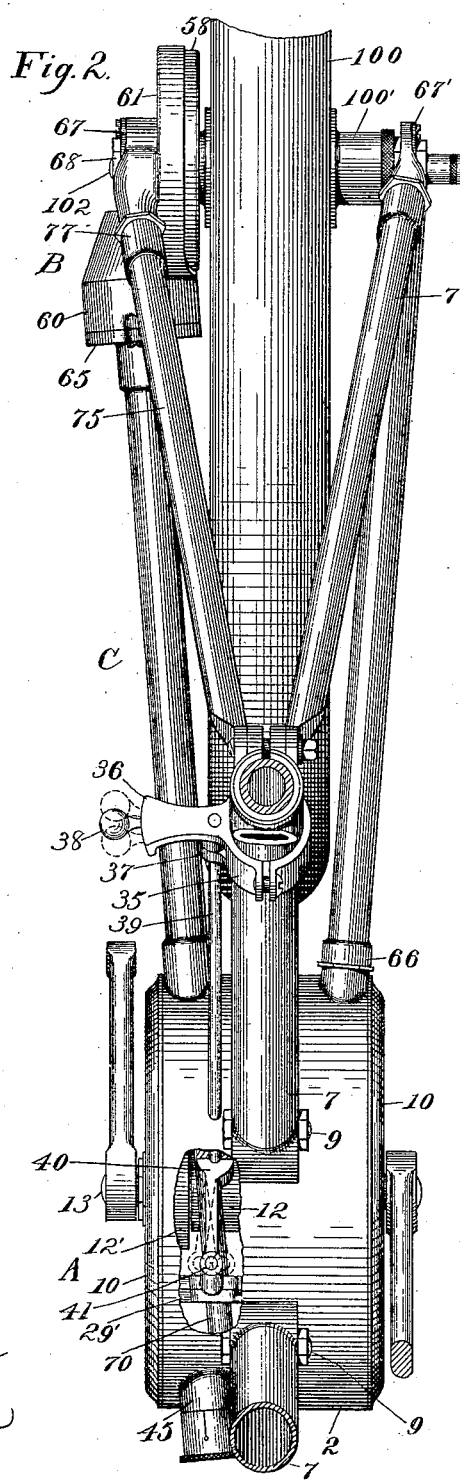

F. H. RICHARDS.
VARIABLE SPEED MECHANISM FOR CHAINLESS BICYCLES.
APPLICATION FILED APR. 20, 1898. RENEWED OCT. 11, 1905.
No. 898,783.
Patented Sept. 15, 1908.
5 SHEETS—SHEET 4.
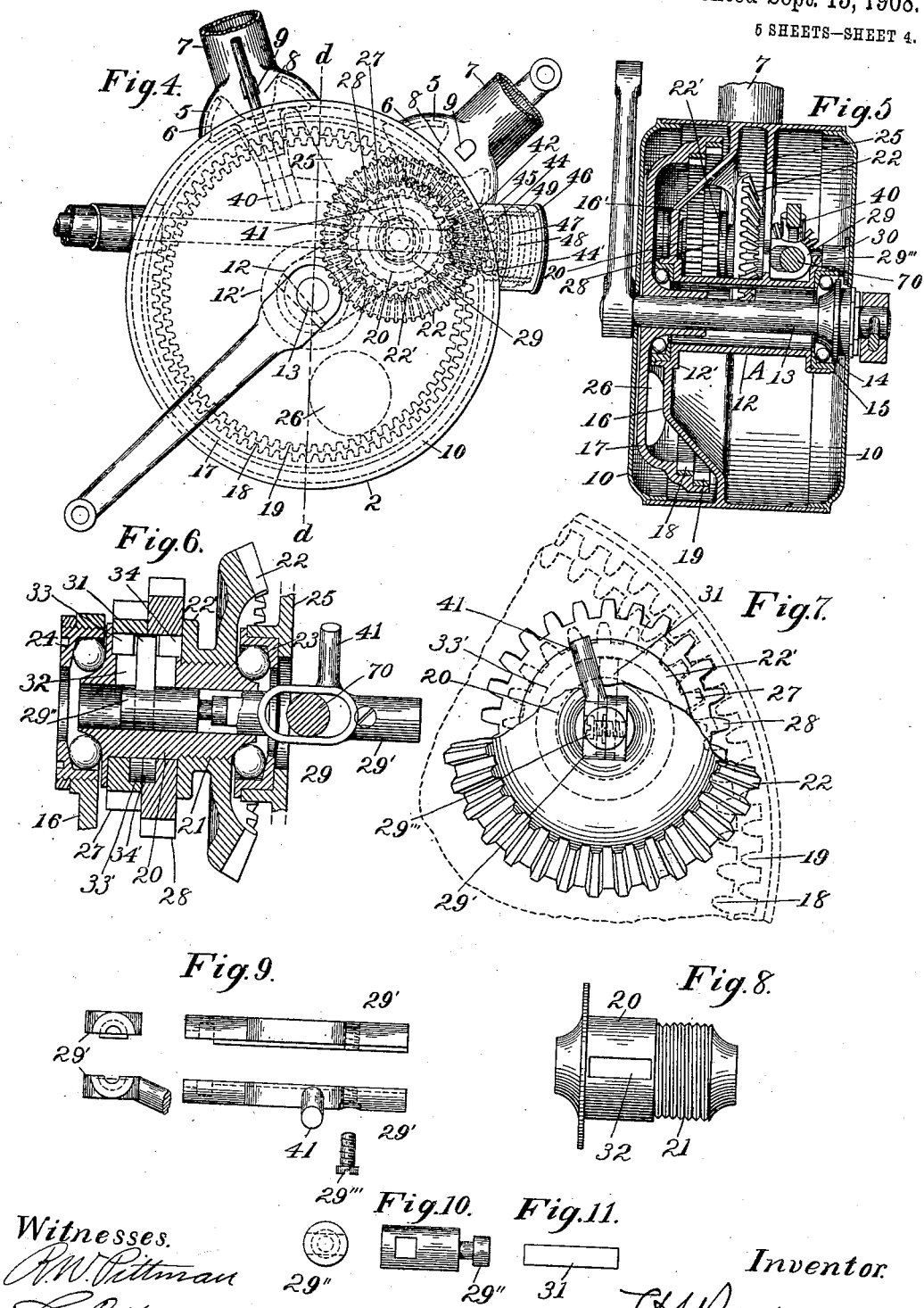

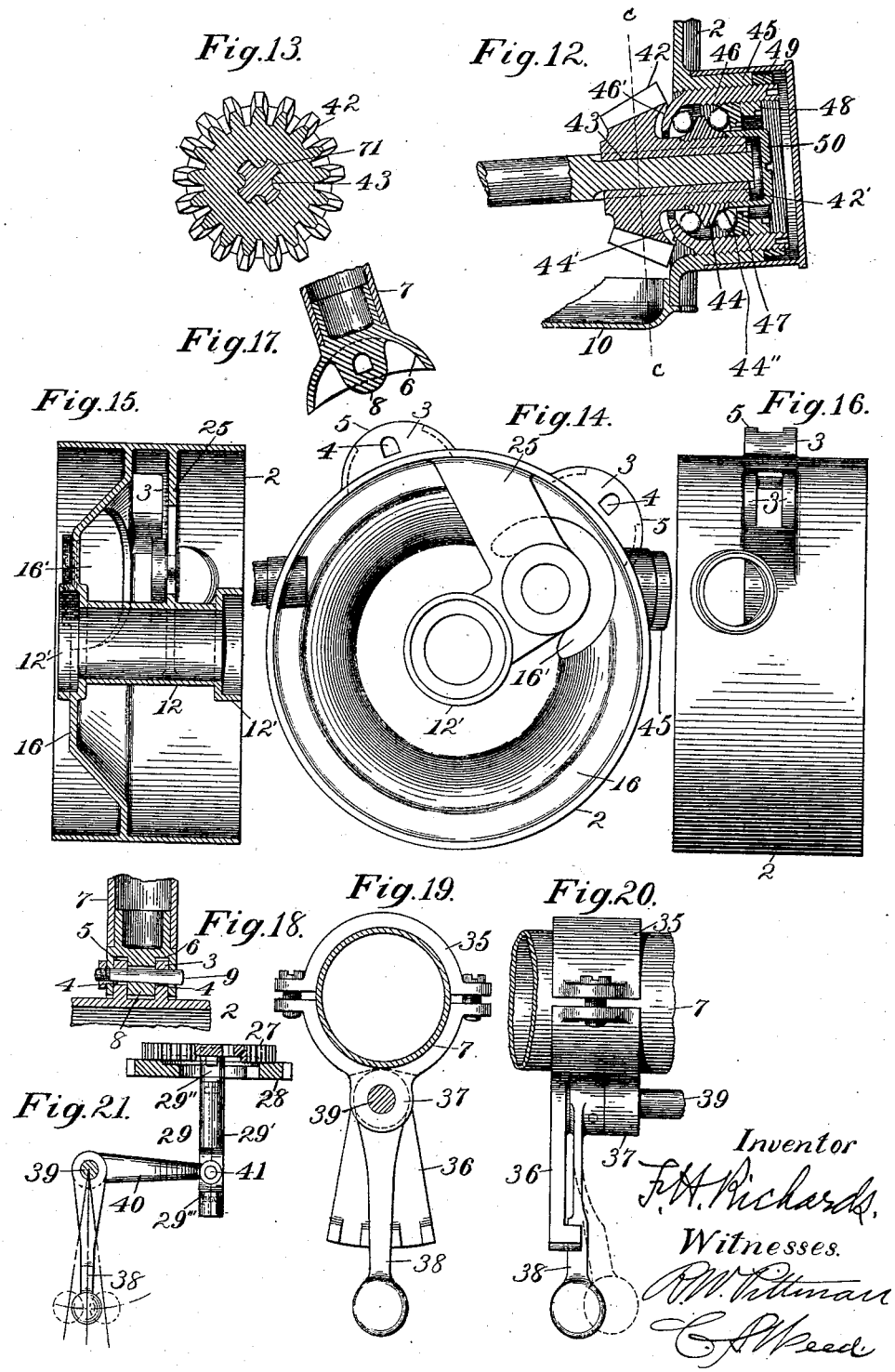

UNITED STATES PATENT OFFICE.

FRANCIS H. RICHARDS, OF HARTFORD, CONNECTICUT.

VARIABLE-SPEED MECHANISM FOR CHAINLESS BICYCLES.

No. 898,783. Specification of Letters Patent. Patented Sept. 15, 1908.

Application filed April 20, 1898, Serial No. 678,235. Renewed October 11, 1905. Serial No. 282,323.

*To all whom it may concern:*

Be it known that I, FRANCIS H. RICHARDS, a citizen of the United States, residing at Hartford, in the county of Hartford and State of Connecticut, have invented certain new and useful Improvements in Variable-Speed Mechanism for Chainless Bicycles, of which the following is a specification.

This invention relates to velocipedes, and more particularly to that class thereof designated as geared bicycles.

One of the objects of the invention is to provide an improved chainless bicycle, the gear of which can be readily changed from a high to a low one, or vice versa, or rendered inoperative by the rider without stoppage of the wheel, so that in use a high gear can be used for level roads, a low gear for hills and uneven roads, and the wheel thrown out of gear, and thereby the turning of the pedals by the driving-wheel is prevented, for coasting.

A further object of the invention is to provide an improved organization of changeable or variable speed driving-mechanism embodying bevel-gears and an adjustable connector, which can be readily adjusted, and will be completely shielded and protected from dust and dirt.

A further object of the invention is to provide a bicycle having driving and driven-mechanisms, said driving-mechanism embodying changeable gear-mechansim, and being so constructed and supported that any strain imparted to the pedal shaft, or any play thereof relative to its bearings, will not affect the proper operation of such driving-mechanism, said driving and driven-mechanisms having an adjustable connection intermediate thereof.

In the drawings accompanying and forming part of this specification, Figure 1 is a side elevation of a bicycle constructed in accordance with this invention, parts of the wheels being broken away. Fig. 2 is plan, partly sectional view, of the rear portion of the bicycle shown in Fig. 1, a part of the crank-hanger gear casing being broken away. Fig. 3 is a horizontal sectional view thereof taken in line *a—a* Fig. 1. Fig. 4 is an enlarged view of the crank-hanger gear casing detached, the driving-gear-mechanism being shown in dotted lines. Fig. 5 is a cross sectional view thereof taken in line *d—d* Fig. 4 and looking toward the right. Fig. 6 is an enlarged sectional view of a portion of the main driving-mechanism. Fig. 7 is an end view thereof looking toward the left with a portion of the main driving-gear shown in dotted lines and a part of the supplemental driving-gear broken away. Fig. 8 is a view of the gear supporting member or carrier. Figs. 9, 10 and 11 are detail views of the variable speed shifting-mechanism. Fig. 12 is an enlarged sectional view of the driven-gear of the driving-mechanism and the supporting means therefor. Fig. 13 is a cross sectional view of said driven-gear taken in line *c—c* Fig. 12. Fig. 14 is a side view detached of the crank-hanger casing. Fig. 15 is a cross sectional view thereof taken in line *d—d* of Fig. 4 and looking toward the right. Fig. 16 is a front view of said casing. Fig. 17 is a sectional view of the lower end of one of the framing members. Fig. 18 is a sectional view showing the connection between said framing member and the crank-hanger casing. Fig. 19 is an underside view of the actuating means for throwing the changeable gear-mechanism into and out of operation on the line *b—b* of Fig. 1. Fig. 20 is a side view thereof. Fig. 21 is a view illustrating the movement of said actuating means and its effect on the shifting-mechanism; and Fig. 22, Sheet 1, is a view, on an enlarged scale, of the means for adjusting the rear driven-gears toward and from each other.

Similar characters of reference designate corresponding parts in the different figures of the drawings.

This improved gear-mechanism comprises driving-mechanism (designated in a general way by A) comprehending a main driving-gear, a supplemental driving bevel-gear, a bevel driven-gear, and changeable or variable speed-mechanism intermediate said main and supplemental driving-gears, said variable speed-mechanism and supplemental driving-gear, in the construction shown, being mounted free or independently of the pedal-shaft; driven-mechanism (designated in a general way by B) also comprehending a driving and a driven bevel-gear supported to impart motion to the driving wheel of the velocipede; and adjustable connecting means (designated in a general way by C) intermediate said driving and driven-mechanisms.

As a preface to a further description of this improvement, I desire to state that the invention is applicable to all kinds of velocipedes, and hence does not necessarily have to be used in connection with that construction of wheel shown herein.

In the drawings the crank-hanger is shown constructed to form a gear casing removably secured to the upright framing members, and, when desired, said casing, together with the driving-mechanism carried thereby, can be bodily removed from the frame. In one form thereof shown and described, this improved crank-hanger, which, as above stated, constitutes a casing for the main driving-mechanism, comprises an annular member or band 2 provided with two pair of ears 3, each pair having a transverse opening or aperture 4. These ears are provided with convex faces 5 for the reception of the concaved or cup-shaped ends 6 of the upright framing members 7, which fit over and completely inclose said ears, which members have transversely apertured projections 8 adapted to extend intermediate said ears, and may be secured thereto by tapering bolts or pins 9 carrying nuts, whereby said framing members and band are rigidly clamped in position. The annular band 2 is provided with a removable plate 10 at each side thereof, whereby the mechanism inclosed within said casing is shielded and protected from dust and dirt. This casing is provided with a tubular hub 12 having flanged ends 12' for the reception of the pedal shaft 13 which is provided with a suitable adjusting cone 14 at one end thereof. The flanged ends 12' support removable ball cups 15 carrying the usual ball bearings for the pedal shaft. The hub 12 is shown supported by a bracket 16 preferably formed as a part of the annular band 2, and said bracket forms a partition dividing said casing throughout the major part thereof into separate chambers, in one of which chambers is carried the main driving-gear 17, which is shown mounted on and secured to the pedal shaft for rotation therewith, the hub thereof forming the fixed cone of said shaft. This gear is provided with sets of internal gear teeth 18 and 19 forming gears of different diameters carried by one web, each set of teeth being preferably formed on the interior of a ring which may if desired be removably secured in position.

Supported independently of the pedal shaft, and disposed laterally of and in parallelism therewith, is a gear carrier 20, one part of which is screw threaded, as at 21 for the reception of the supplemental driving bevel-gear 22 having a correspondingly screw threaded and flanged hub 22'. This gear carrier is provided at each end with cones in bearing engagement with suitable ball bearings carried by cups 23 and 24, one of which, as 23, is shown supported by a flanged bracket 25, joined to the tubular hub and to the gear casing, while the other and adjustable cup 24, is in threaded engagement with the wall of an annular opening in the casing partition 16, said cup being maintained in position by a check nut. Both of these ball cups have axial openings, the opening of the cup 24 registering with an opening 26 formed in the main driving-gear when said gear is or has been rotated in position for this purpose, so that the bearings for the gear carrier can be adjusted after removing the pedal and casing side cap at that side of the gear casing. Loosely mounted on this gear carrier and in position to mesh with the teeth of the main driving-gear, is the changeable or variable speed-mechanism shown herein comprising a pair of spur gears 27 and 28 of different diameters, each meshing with one set of teeth of the internal driving-gear 17. To permit the proper disposition and operation of this variable speed-mechanism, the casing partition 16 is suitably cut away, as at 16'. To throw one or the other of said gears into operative connection with the supplemental driving-gear, as desired, or to throw both of them out of operative connection therewith, suitable mechanism is provided which may be operated by the rider at any time while the velocipede is running. This mechanism, which will be herein designated as shiftable-mechanism, in the form shown comprises a longitudinally adjustable member 29 formed of two parts 29' and 29" shiftable as a whole, and the part 29" of which is rotatable relatively to the other. One end of this shiftable member 29 is mounted in a support or bearing 30 projecting inwardly from the plate 10, while the other end thereof projects into the axial bore of the gear carrier 20. The part 29' may be provided with a recess for the reception of a flange on the part 29", said recessed member preferably being made in two longitudinally divided members, connected by a tongue and groove and a suitable fastening device or screw 29'''. By means of this construction the part 29" is not only shiftable with its companion, but is rotatable independently thereof. This rotatable part 29" carries a transversely projecting key 31 extending through a slot 32 in the gear carrier 20, so that it is rotatable with said gear carrier, and is in position, when shifted, to enter notches 33 and 34 formed in the spur gears 27 and 28. The adjacent sides of said gears are provided with annular recesses 33' which form a passage 34' which will permit, when the key 31 is in its intermediate position, both of said gears to rotate loosely on the gear carrier 20 without imparting motion thereto, but when said key is shifted to one side or the other of its intermediate position, and into the notch 33 or 34 of the gears, the gear carrier will be rotated with such gear to impart motion to the supplemental driving bevel-gear 22, and through the same to the driving wheel of the bicycle. By the provision of this annular passage, it will be observed that the key is first completely disconnected from one gear before it can be shifted into engagement with the other gear, thereby avoiding all danger of breakage of any part of the mechanism.

To shift member 29'', and thereby the key 31 into engagement with one or the other of the gears, suitable actuating means is provided, shown carried in position to be readily operated by the rider. In the present construction this actuating means preferably comprises supporting means, such for instance as a clamping collar 35, (see Figs. 1 and 2,) which may be secured to the seat-post framing member of the machine. This clamping collar is shown having a notched projecting member 36, and below the same an apertured ear 37 intermediate which is carried a resilient and shiftable actuator or handle 38 adapted to be seated in one or the other of the notches of the series, which are shown herein as three in number. This actuator is secured to the upper end of a connector, such as a rod 39, projecting through said ear and into an opening of said notched member. The lower end of this rod projects through the annular band 2, and into the gear casing, and carries an arm 40, the opposite end of which is secured to a projection or stem 41 formed on the shiftable member 29. From the above it will be seen that by seating the actuator in the middle notch, when for instance it is desired to coast, the shiftable member will be moved to carry the key 31 into the annular passage 34' intermediate the two spur gears and out of engagement therewith, so that while the driving wheel will, through the transmitting-mechanism, rotate the supplemental driver and gear carrier, the spur gears will not be rotated, thereby permitting the main driving-gear and pedals to remain idle and avoiding all resistance incidental to such mechanism. When the pedals are to be connected with the wheel, the actuator is shifted into one or the other of the notches of the series, whereupon the key will be carried into engagement with one or the other of the spur gears, as the case may be. In view of the fact that the key 31 cannot be shifted from its annular passage 34' so as to enter the notch of either of the spur gears until such key has been rotated by the gear carrier, presuming that the wheel is running and the pedals are idle, into position to register with such notch although the rider may have previously shifted the actuator, the connecting means between the handle and shiftable member are constructed to yield so that the actuator can be shifted at any time, and when the key has been rotated into position to register with the proper notch, it will immediately spring or snap in position and form connection between the carrier and the desired spur gear. The driven-gear of this driving-mechanism, which may also constitute one part of the transmitting-mechanism, comprises a bevel-gear 42 (see Figs. 3 and 12) shown provided with a relatively long hub 42' having a series of longitudinal grooves 43, and a double-faced cone 44 in threaded engagement therewith. In the present construction this driven-gear is shown forward of the pedal shaft, and the annular band 2 of the gear casing is provided with a hub 45 supporting an adjustable bearing member 46 having an inwardly curved wall or flange 46' forming with the inner face 44' of the cone a race for suitable ball bearings for the gear. This adjustable member is provided with interior threads, in engagement with which is a cone 47 forming with the other or outer face 44'' of the cone 44 a race for the reception of suitable ball bearings. This cone 47, as well as the adjustable bearing member 46, are maintained in position by suitable check nuts 48 and 49 respectively, while the double-faced cone 44 is maintained in position by a check nut 50 shown in the nature of a cap held on the gear hub. The tubular member 45 is closed by a removable cap, to permit the bearings and also the gear to be adjusted by turning the adjustable bearing member 46, which is provided with pin holes for this purpose, as is also the check nut 48 and cone 47.

The driven-mechanism (designated in a general way by B) comprises a pair of bevel-gears 55 and 56, one of which is rigidly secured to the hub 100' of the driving wheel 100, said hub having mounted thereon a bevel-gear 55, the hub of which is recessed for the reception of ball bearings, which are maintained in position by a cone 57 carried on the wheel axle 102. The companion or driving-pinion 56 of this driven-mechanism is supported, by suitable bearings, in position to mesh with said driven-gear, and both of said gears are disposed in a dust-proof casing, one member of which is shown as a cap 58 fitted in the member 59 thereof which is mounted on the outer end of the wheel axle. This member 59 consists substantially of a casing 60 and a rearwardly extending plate 61, said casing being shown provided with a cup 62 forming with one hub end of the bevel-gear 56 a race for the reception of ball bearings. The outer end of the casing is screw threaded to receive an adjustable ring 63 forming one member of a ball-race and being maintained in position by a check nut 64. The outer end of this tubular casing is closed by a suitable cap 65 carried on one end of the tubular side frame, the opposite end of which is rigidly secured to the crank hanger casing. The opposite side frame may be removably secured to the crank hanger casing by a coupling sleeve 66 threaded to engage a projection, not shown, formed on the casing.

To adjust the gears toward and from each other, suitable means is provided (Figs. 3 and 22), shown herein as an eccentrically slotted member 67 pivotally secured to the outer side of the rear gear casing, and in position to have the driving wheel axle project through the slot thereof, said axle carrying a lock nut 68, which maintains said slotted member in its adjusted position. On unclamping this lock nut 68 the slotted member can be shifted up or down, thereby shifting the rear wheel axle and therewith the gear carrier on the hub of the rear wheel toward or from its companion gear. The opposite rear fork is also provided with a similar adjusting means 67'.

The means (designated generally by C) for imparting motion from the driving-mechanism to the driven-mechanism, in the present construction thereof, comprises a side shaft 70 rigidly connected with the driving-gear 56 of the driven-mechanism B, and longitudinally movably held at its opposite end in the driven-gear 42 of the driving-mechanism A. The shaft is shown in the present structure projecting forwardly of the pedal shaft, and through a transverse aperture in the shiftable member 29 and into the gear 42 of the driving-mechanism, and it is provided with a series of longitudinally extending ribs or flanges 71. By this construction, any springing of one part of the bicycle framing relative to the other is permitted by said shaft, as by this mode of connection the shaft will constantly rotate with the gear 42, but is longitudinally adjustable relatively thereto, and may also be slightly laterally adjustable thereto, if desired.

The rear fork members 75 and 76, which are usually removably secured to the seat-post by suitable clamping means, are shown herein also removably connected to the horizontal side frames by couplings 77 similar to the coupling 66, so that by disconnecting the lower end of the member 75 and disconnecting the upright framing members 7 from the crank hanger casing, said crank hanger casing, inclosing the pedal-shaft and driving-mechanism, together with the side shaft and rear casing, except the cap 58, can be quickly and readily disassembled for cleaning or other purposes.

In operation, when a high gear is desired, it is merely necessary to shift the actuator 38 into one of the notches, whereupon the key 31 will be shifted into position to engage the spur gear having the smallest number of teeth, and as the same, if the pedals are in use, is constantly turning with the internal main driving-gear, motion will be imparted to the gear carrier and to the supplemental driving-gear 22, and from thence, by means of the transmitting-mechanism, to the driving wheel 100. When, however, it is desired to coast, it is simply necessary to seat the actuator 38 into the middle notch, whereupon the key is shifted into the annular passage 34' and out of engagement with either of the spur gears, which, together with the pedals, may remain idle and thus decrease the frictional resistance to the speed of the wheel. If, however, a low gear is desired, the actuator 38 is shifted into the other notch.

In conclusion it will be seen that by this improved organization of bevel-gear driving-mechanism, a wheel is provided which not only avoids the use of a chain, but also enables the rider to use a high or low gear, as desired, and at the same time permits the gears to be thrown completely out of operation, thereby to permit the wheel to run free for coasting. It will also be seen that by this improved organization and assemblage of gear-mechanism, the springing of one part of the framing relative to the other has no effect whatever to separate the intermeshing gears, and that the major portion of the main driving-mechanism embodying the variable speed gear-mechanism is carried free and independent of the pedal-shaft, so that any adjustment thereof or shifting of such shaft will not affect such gear-mechanism, this being so especially in view of the fact that the internal main driving-gear and the intermeshing gears are spur gears. In other words, the main driving-gear may be more or less shifted without interfering with the intermeshing of the teeth, which could not be the case with the bevel-gears, as they must have a rigid non-movable support, whereby they will be maintained in perfect mesh at all times.

It will be understood that the gearing may be readily changed to give a higher or lower gear, if desired, than that shown herein.

I claim as my invention:—

1. The combination with a casing having interiorly a hub provided with a projecting bracket, the latter being connected to the casing, of a driving shaft mounted in said hub; differential gears carried by said driving shaft; a gear carrier journaled in the bracket and casing; gears of different sizes loosely mounted on said gear carrier and meshing with the shaft differential gears; a gear fixed to said gear carrier; a driven shaft having a gear in mesh with said fixed gear; and a clutch for locking the desired loosely-mounted gear to the gear carrier.

2. The combination, with a pedal-shaft, of a casing having a hub in which said shaft is mounted; a differential gear secured to the pedal-shaft and inclosed by the casing; brackets projecting from the hub and the casing; a tubular gear-carrier journaled in said brackets; a gear fixed to said gear-carrier; gears of different sizes loosely mounted on the gear-carrier; a clutch; a shiftable member working in the tubular gear-carrier and serving to actuate said clutch; and means connecting the fixed gear on the gear-carrier with the driven wheel of the velocipede.

3. The combination, with a casing having a partition and a hub, of a pedal-shaft mounted in the hub; an internal gear having a series of sets of teeth, one set of different diameter from another set, secured to the pedal-shaft and mounted in one of the compartments of the casing; a gear-carrier journaled in a bracket projecting from the hub and in said partition; a series of gears of different sizes loosely mounted on said gear-carrier; a fixed gear carried by the gear-carrier; a shiftable member carrying a clutch for engagement with notches in either of the gears loosely mounted on the gear-carrier; means for actuating said shiftable member; a side shaft carrying a gear at one end in mesh with the fixed gear of the gear-carrier, and also having a gear at its opposite end; and a driving-wheel the hub of which has a gear in engagement with the gear of the side shaft.

4. In a velocipede, the combination with a casing, of a pedal shaft mounted in the casing; gearing comprising sets of driving teeth of different pitch diameters carried by said pedal shaft; a gear carrier located forwardly of the pedal shaft; gears of different pitch diameters loosely mounted on the gear carrier and having clutch-receiving notches; a shiftable member having a clutch pin; means for actuating said shiftable member to cause the clutch pin thereof to engage one of the loosely-mounted gears or to assume an idle position between said gears; a fixed gear carried by the gear carrier; and gearing for connecting said fixed gear with the driving wheel of the velocipede, comprising a rearwardly-extending side shaft located above the pedal shaft and operatively connected with said fixed gear on the gear carrier.

5. In a velocipede, the combination with a casing having an interiorly-located hub portion with a laterally-projecting bracket, of a pedal shaft mounted in said hub; an internal gear having rings of teeth of different diameters carried by the pedal shaft; a gear carrier located forwardly of the pedal shaft and mounted in the bracket projecting from the hub and in a part of the casing; loosely mounted gears of different diameters carried by the gear carrier; a clutch for locking any of said gears to said gear carrier; means for actuating the clutch; a bevel gear fixedly secured to the gear carrier; a side shaft passing through the casing above the pedal shaft and having a bevel gear at one end forwardly of the pedal shaft in mesh with the bevel gear on the gear carrier; a casing surrounding said shaft; a bevel gear at the opposite end of said shaft; and a bevel gear on the driving wheel with which said last-named bevel gear is in mesh.

6. The combination with a casing having a partition dividing the same into separate compartments and also having an interiorly-located hub, of a pedal shaft mounted in said hub; a bracket projecting from the hub and having a flange portion; a gear carrier mounted forwardly of the pedal shaft in the flange of said bracket and in a part of the partition, said gear carrier having a slot to receive a clutch pin or key; a pair of loose gears mounted on the gear carrier; a gear having sets of internal teeth of different diameters carried by the pedal shaft, said sets of teeth being in mesh with the loosely mounted gears on the gear carrier; a shiftable member carrying a clutch pin for engagement with notches in the loosely mounted gears; means for actuating said shiftable member; a gear fixed to the gear carrier; a shaft passing above the pedal shaft and through a slot in the shiftable member and supported in front of the pedal shaft by the casing; a gear carried by said shaft and located forwardly of the pedal shaft; and means connecting said gear with the driving wheel of the velocipede.

7. In a velocipede, the combination with a casing having a partition or cross web and also having a hub supported at one end by the web, of a pedal shaft mounted in said hub; caps for closing the ends of the casing; a gear secured to the pedal shaft and located on one side of said web; a driving wheel; and means located on the other side of the web and supported thereby and by the casing for connecting said gear to said driving wheel.

8. In a velocipede, the combination with a casing having a partition or cross-web and a hub projecting from and integral with said partition, said hub having a laterally-projecting bracket also uniting it with the interior of the casing, of a pedal shaft mounted in said hub; a gear secured to said pedal shaft; a gear carrier located forwardly of the pedal shaft parallel to the hub and mounted in the bracket projecting therefrom and in said partition; a gear carried by said gear carrier; and mechanism connecting said gear with the driving wheel of the velocipede.

9. In a driving mechanism for a velocipede, the combination with a revoluble gear carrier and with means for supporting the same, of a pair of gears of different diameters loosely mounted on said gear carrier, each of said gears having a notch; a two-part shiftable member both parts of which are mounted concentrically with the gear carrier, one of said parts being rotated therewith and the other part being fixed from rotation; a clutch pin or key carried by said shiftable member; a device connected with said shiftable member; and a flexible actuator rod carrying an arm connected with said device.

10. In a velocipede, the combination, with a casing having a partition divided into separate compartments and also having a hub connected to said partition, of a pedal-shaft mounted in said hub; a tubular gear-carrier having conical ends and mounted in supports projecting from the hub; ball-cups secured in said supports; balls interposed between the conical ends of the gear-carrier and said cups; an internal gear having sets of teeth of different diameters secured to the pedal-shaft; gears of different diameters loosely mounted on the gear-carrier and having notches; a shiftable member movable back and forth in the gear-carrier; a clutch-pin or key carried by said shiftable member; a fixed gear carried by the gear-carrier; a side shaft passing through the shiftable member and having a gear in engagement with said fixed gear; and means for connecting said side shaft with the driving-wheel of the velocipede.

11. In a bicycle, the combination of a pedal shaft mounted in bearings; a main driving-gear carried thereby and having two sets of internal gear teeth; an axially bored peripherally slotted gear carrier mounted independently and laterally of said pedal shaft on adjustable bearings and carrying a supplemental driving-gear; a pair of gears loosely mounted on said gear carrier and in engagement with said main driving-gear, and each of said gears being provided with a pair of communicating recesses, one of greater depth than the other, said outer recesses forming an annular passage intermediate said gears; a driven-gear supported by adjustable bearings and in engagement with said supplemental driving-gear; a two-part shiftable member having one end thereof supported in the axial bore of said gear carrier and having one part thereof rotatable with said gear carrier and independently of the other part thereof; a key secured to said rotative member and shiftable into one or the other of the recesses of the gears, or into the annular passage intermediate said gears; and actuating means for operating said shiftable member, and comprising an actuator, a lever secured to said shiftable member, and a rod connecting said actuator and lever.

12. A crank hanger gear casing comprising a band provided with an extension and with a pedal shaft hub; a cap closing said extension; said pedal shaft hub having flanged ends forming ball-receiving cups adapted to form bearings for a shaft and said hub and band being connected by a partition wall, dividing said casing into separate chambers throughout the major portion thereof, said wall having an opening for the meshing of gears therethrough; a bracket connecting said pedal shaft hub with said band and having an annular flange in alinement with said opening of the dividing wall, in combination with a pair of removable axially bored side plates.

13. In a bicycle, the combination of a gear having a hub; and means for supporting and adjusting said gear, and comprising an interiorly threaded tubular support, an exteriorly and interiorly threaded adjusting member in engagement with said support, and provided with an inwardly extending annular flange encircling said gear hub, a cone in engagement with the interior threads of said adjustable member, and a double-faced cone intermediate the annular flange of said adjustable member and said cone and forming therewith a pair of races for the reception of ball bearings, said first-mentioned cone being movable with and also independently of said adjustable member.

14. In a velocipede, the combination with a casing having an internal web, of a hub supported at one end by said web, a pedal shaft mounted in said hub, means for closing the casing, a gear secured to said pedal shaft, a driving wheel, and means for connecting said gear to the driving wheel.

15. In a velocipede, the combination with a casing, a hub supported within the casing, a pedal shaft mounted in said hub, means for closing the casing, a gear fast to the pedal shaft, a driving wheel, and means for connecting said gear to said driving wheel.

FRANCIS H. RICHARDS.

Witnesses:
C. A. WEED,
CHAS. FINKLER.